Patented July 9, 1929.

1,720,329

UNITED STATES PATENT OFFICE.

HERMAN HEUSER, OF CHICAGO, ILLINOIS, ASSIGNOR TO UNITED STATES PROCESS CORPORATION, A CORPORATION OF ILLINOIS.

MANUFACTURE OF FERMENTED BEVERAGES OF REDUCED ALCOHOL CONTENT.

No Drawing. Application filed September 25, 1926. Serial No. 137,823.

The present invention relates to improvements in the manufacture of fermented beverages and potable liquors of reduced alcohol content and more particularly to hopped fermented cereal beverages of low alcohol content.

In the manufacture of liquids of this type, in ordinary practice a hopped wort is prepared which will give a product of the desired strength. This wort is fully fermented and the alcohol content thereof in excess of the desired or permissible amount, say 0.5% is removed by evaporation at normal atmospheric or sub-atmospheric pressure, the beverage residue being then diluted, if desired, to its original extract strength. Similar products of low or reduced alcohol content may be likewise produced by preparing a wort containing a reduced proportion of fermentable extract material as compared with its total extract substances, and fermenting such a wort to a point where its alcohol content does not exceed the desired or permissible amount. In general, the latter method is not found desirable and the former method of operation is preferred.

In accordance with the present invention, a low or reduced alcohol containing beverage or liquors is produced by a known method, for example, by fully fermenting a wort and subsequently reducing its alcohol content by evaporation or distillation. In order to restore to the beverage the flavor and bouquet of a fully fermented beverage and to remove from it such undesirable flavors as may be imparted in the reduction of its alcohol content, a controlled proportion of glycyrrhizin is added to the beverage, preferably in the form of licorice extract, although if desired, either ground licorice root or technically pure glycyrrhizin may be added in the desired proportions. In general, it is found that, in operating in accordance with the invention, up to 0.010 to 0.015% of the ordinary black licorice extract or mass derived from licorice roots may be added for each pound of alcohol removed in the alcohol reduction process or the equivalent of which is to be supplied. Thus if an ordinary fermented stock containing 3% alcohol is reduced in its alcohol content to 0.1%, and if it is desired to approximate the beverage characteristics of the original material up to 0.0766 to 0.115 lbs. of licorice extract may be added per barrel of beverage. If desired, a lesser quantity of licorice extract may be employed.

As an example of the manner in which the present invention may be carried out, an ordinary hopped cereal wort may be prepared and fermented in the usual manner, the alcohol content after fermentation being 3% by weight. It is then boiled in a suitable evaporator to remove a desirable portion of its alcohol content, say until the residual alcohol content is 0.10% by weight. During the alcohol reduction the licorice extract is added to the wort, and is thus present while the latter is boiled or heated to effect the evaporation of its alcohol content. Up to 0.115 lbs. of licorice extract may be thus supplied per barrel or beverage, a lesser amount being added if desired. In some cases, slightly larger amounts may be required as determined by the desired flavor. When added in the proportions set forth, there is a substantial restoration of the sweetness lost by reduction of alcohol and removal of flavors caused by evaporation of the alcohol content without producing a perceptible licorice taste in the final product.

It is preferred that the flavor and other beverage characteristics of the product be further improved by a limited yeast fermentation in the dealcoholized or alcohol reduced beverage as described in my prior Patent No. 1,302,551, of May 6, 1919 and in Reissue No. 14,889, the secondary fermentation being so conducted as to produce not more than 0.5% of alcohol or such legally permissible amount as may be desired in the final beverage. In such case, the proportion of licorice extract added to the fermented wort during the process of alcohol reduction may be reduced proportionately to the amount of additional alcohol supplied during the secondary fermentation. Thus, if an additional 0.15% of alcohol by weight is supplied during the secondary fermentation, bringing up the total alcohol content of the final product to 0.25% (in the illustrative case above), from 0.073 to 0.109 lbs. of licorice root will ordinarily be found sufficient.

After the beverage or liquid has been prepared, and, if desired, diluted to the extract value of the beverage stock before evaporation of its alcohol, it is cooled to a low temperature, say 1 to 2° R. and is then settled and preferably filtered, the filtration removing the yeast particles or other solid matter that may be present in the beverage together with any of the natural oil or fat contained in the licorice extract and congealed by the cooling. The cooled beverage is then carbonated, filtered and packaged in the usual way. As the desired sweetness is imparted to the beverage without the addition thereto of fermentable carbohydrate materials, there can be no undesired fermentation or increase in alcohol content of the beverage, which therefore retains to the fullest extent its desired beverage characteristics.

If desired, pure glycyrrhizin or other glycyrrhizin containing material than licorice extract may be employed. For example, ground licorice root may be employed, being immersed in the fermented wort during dealcoholization, preferably enclosed in textile bags. Licorice has been found particularly desirable as a source of glycyrrhizin in the process of this invention, by reason of its content of asparagin. This is particularly true when the process of the present invention is employed in connection with a secondary fermentation, as above described, because the asparagin content of the added licorice greatly aids the propagation of the yeast in the secondary fermentation without increasing the alcohol produced thereby, and improves the flavor of the final product.

I claim:

1. The process of improving the taste, flavor and bouquet of alcohol-reduced fermented potable liquids which consists in adding glycyrrhizin thereto.

2. The process of improving the taste, flavor and bouquet of alcohol reduced fermented potable liquids which comprises producing a hopped cereal wort, fermenting said wort, heating the fermented wort to remove alcohol therefrom and reduce its alcohol content to within the legally permissible limit and supplying glycyrrhizin in the alcohol reduced product.

3. The process of producing low alcoholic fermented cereal liquids which consists in boiling an alcoholic cereal beverage stock to remove alcohol therefrom and reduce its alcohol content to an amount within legally permissible limits and supplying licorice extract in said beverage during the boiling thereof.

4. The process of producing low alcoholic fermented cereal liquids which consist in heating an alholic fermented cereal wort to remove alcohol therefrom and reduce its alcohol content to within the legally permissible limit, supplying licorice extract in said wort during the heating thereof, subquently cooling the alcohol reduced material, and producing a secondary fermentation therein.

HERMAN HEUSER.